(12) United States Patent
Lee (10) Patent No.: US 7,520,685 B2
(45) Date of Patent: *Apr. 21, 2009

(54) SECURITY CAMERA (75) Inventor: Woon-ho Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 417 days.

This patent is subject to a terminal disclaimer.

(21) Appl. No.: 11/367,323

(22) Filed: Mar. 6, 2006

(65) Prior Publication Data

US 2007/0041727 A1 Feb. 22, 2007

(30) Foreign Application Priority Data

Aug. 19, 2005 (KR) .................. 10-2005-0076484

(51) Int. Cl.
*G03B 17/00* (2006.01)
*H04N 5/225* (2006.01)
(52) U.S. Cl. .................... 396/427; 348/373
(58) Field of Classification Search ........... 396/419, 396/427; 348/373, 208.3, 375, 151
See application file for complete search history.

(56) References Cited

U.S. PATENT DOCUMENTS 5,394,209 A * 2/1995 Stiepel et al. .......... 396/20
6,793,415 B2 * 9/2004 Arbuckle .............. 396/427
6,850,025 B1 * 2/2005 Paolantonio et al. ...... 318/685
2006/0147194 A1 * 7/2006 Jones .................. 396/427
2007/0053681 A1 * 3/2007 Arbuckle .............. 396/427

FOREIGN PATENT DOCUMENTS

| CN | 2146093 | 11/1993 |
|---|---|---|
| JP | 11-298766 | 10/1999 |
| JP | 2000-350058 | 12/2000 |
| JP | 2001-174902 | 6/2001 |
| KR | 20-2000-0020700 | 9/2000 |
| KR | 20-0368732 | 11/2004 |

* cited by examiner

*Primary Examiner*—Melissa J Koval
*Assistant Examiner*—Autumn Parker
(74) *Attorney, Agent, or Firm*—Roylance, Abrams, Berdo & Goodman, L.L.P.

(57) ABSTRACT

A security camera includes a camera unit, and a top plate rotatably supporting the camera unit. A movable circuit board is disposed above the top plate. A fixed circuit board is rotatably disposed to be spaced from the movable circuit board by a predetermined gap. An electric wire electrically connects the movable circuit board and the fixed circuit board. A slip ring substantially prevents the connection electric wire from being twisted by rotational movement of the movable circuit board. A connection unit supports the slip ring and rotatably supports the top plate.

15 Claims, 9 Drawing Sheets

SECURITY CAMERA

CROSS REFERENCE TO RELATED APPLICATION

This application claims the benefit under 35 U.S.C. § 119(a) from Korean Patent Application No. 2005-76484, filed on Aug. 19, 2005, the entire content of which is hereby incorporated by reference.

BACKGROUND OF THE INVENTION

1. Field of the Invention

The present invention relates to a security camera. More particularly, the present invention relates to a security camera that has an improved electric wire connecting part connected to a fixed circuit board and to a movable circuit board, and an improved assembling structure of a rotation supporting part rotatably supporting a camera.

2. Description of the Related Art

Generally, security cameras are being used more frequently in many places, such as residential streets, parking lots, department stores, banks, exhibition halls, and so forth, to prevent illegal acts, such as robberies, from being committed.

The aforementioned security cameras are classified in two categories: fixed-type cameras capable of observing a certain area and movable-type cameras capable of observing a wide area range by using a pan and tilt motor unit.

Fixed-type cameras have a drawback in that the observation direction is fixed, thereby requiring a plurality of cameras to be installed in several positions to observe different areas in the same space. Therefore, the movable-type cameras are gaining more popularity.

One example of such the movable-type camera is disclosed in Japanese Patent Publication No. 2001-174902.

Figure 1:
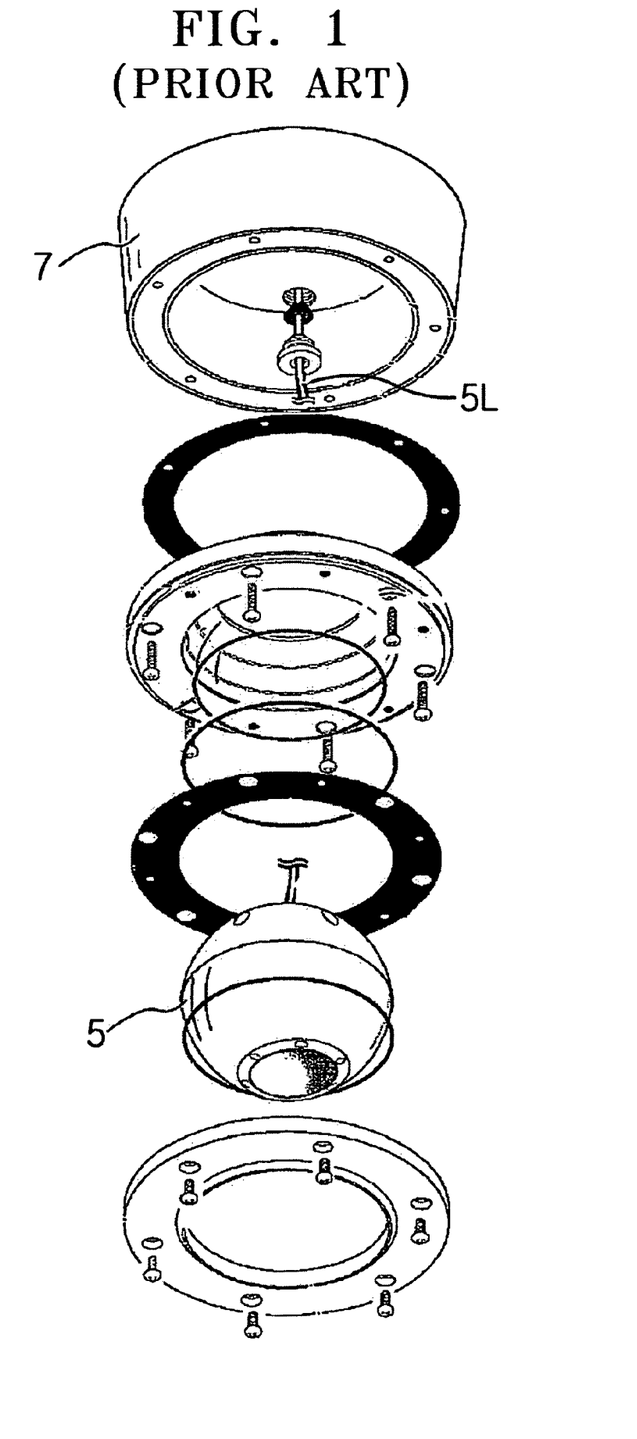
FIG. 1 is a perspective view of a security camera disclosed in Japanese Patent Publication No. 2001-174902.

FIG. 1 is a perspective view of a security camera disclosed in Japanese Patent Publication No. 2001-174902.

As shown in FIG. 1, various electric devices installed inside a rotatable case 5 and a circuit board (not shown) installed inside a base 7 fixedly mounted on a ceiling or the like are connected by an electric connection wire 5L.

Movable-type cameras need to be configured such that the connection wire 5L connecting the various electric devices installed inside the rotatable case 5 and the circuit board installed inside the base 7 is stably installed without being affected by a rotating camera part.

Accordingly, a need exists for an improved security camera having a compact size and being efficiently assembled.

SUMMARY OF THE INVENTION

A first feature of the present invention is to provide a security camera in which connection of electric wires connected between a fixed circuit board installed inside a base fixed to a ceiling or the like and a movable circuit board provided on a rotatable plate rotating a camera module may be performed more efficiently.

A second feature of the present invention is to provide a security camera having a reduced size by combining a rotation support part for rotatably supporting a camera unit, a slip ring substantially preventing twisting of the connection electric wire, and a gear part for transmitting a power used in rotating the camera unit into one body.

A third feature of the present invention is to provide a security camera that is more efficiently assembled by substantially preventing free movement of a connection unit, and having a slip ring and a rotation support part combined into one body in close contact with a middle plate.

A security camera according to an exemplary embodiment of the present invention includes a camera unit, and a top plate rotatably supporting the camera unit. A movable circuit board is installed on the top plate. A fixed circuit board is installed to be spaced apart from the movable circuit board by a predetermined gap and to be reciprocatingly rotatable. An electric connection wire electrically connects the movable circuit board and the fixed circuit board. A slip ring substantially prevents the connection electric wire from being twisted by rotational movement of the movable circuit board. A connection unit supports the slip ring and rotatably supports the top plate.

According to an exemplary implementation of an embodiment of the present invention, the connection unit may include a middle plate installed on one side of the fixed circuit board and provided with a through hole. A gear pan is combined with the middle plate and shaped into a tube with its upper and lower end open. A bearing is installed inside of the gear pan. A bearing holder is inserted in the bearing from one end of the bearing and combined with the top plate. A bearing cover is connected to the bearing holder and supports the other end of the bearing. A slip ring holder connected to the gear pan fixes the slip ring to the inside of the gear pan.

According to an exemplary implementation of an embodiment of the present invention, the gear pan may include a gear pan body provided with a bearing support part supporting an outer surface of the bearing and shaped into a cylinder with its upper and lower ends open. A flange part is formed at one end portion of the gear pan body and provided with a fixture hole to fix the gear pan with the middle plate. A bearing disengagement prevention projection is formed at one end portion of the bearing support part to prevent disengagement of the bearing.

According to an exemplary implementation of an embodiment of the present invention, the bearing holder may include a bearing holder body shaped into a cylinder with its one end open and provided with an engagement protrusion that is brought into contact with the one end of the bearing to prevent further insertion thereof when the bearing holder body is inserted in an inner surface of the bearing to a predetermined depth. A bearing holder connection surface is formed in the other end portion of the bearing holder body and is provided with a through hole formed in its center portion and a fixture hole to fix the bearing holder to the top plate.

According to an exemplary implementation of an embodiment of the present invention, the bearing cover may include a bearing cover body inserted inside the bearing holder body and shaped into a cylinder with its one end open. A bearing cover connection surface is brought into contact with the bearing holder connection surface and provided with a fixture hole into which fixture screw is screwed to combine the bearing cover with the bearing holder. A through hole is formed in a center portion of the bearing cover connection surface. A bearing support projection is formed at the one end portion of the bearing cover body to support the other end of the bearing.

According to an exemplary implementation of an embodiment of the present invention, the slip ring holder may include a slip ring holder body inserted in an inner surface of the bearing support part and shaped into a cylinder with its upper and lower ends open. A slip ring fixing part is provided in a center portion of the slip ring holder body to allow the slip ring to pass through an inside thereof and provided with a support protrusion formed on one end portion thereof to support the slip ring.

According to an exemplary implementation of an embodiment of the present invention, the slip ring may have a flange part formed on its outer surface and provided with an insertion hole into which the support protrusion is inserted.

According to an exemplary implementation of an embodiment of the present invention, a plurality of the support protrusions are installed on the slip ring fixing part at a predetermined interval. Each of the support protrusions may be provided with a slit formed in a lengthwise direction thereof to be split into two halves. An engagement protrusion may be formed on an upper end portion of each half of the split support protrusions to prevent disengagement of the support protrusion from the insertion hole after being inserted therein.

According to an exemplary implementation of an embodiment of the present invention, a support member may be formed to support the slip ring holder on the bearing support part.

According to an exemplary implementation of an embodiment of the present invention, the support member may have a support pin formed in the bearing support part to be resilient in a radial direction. A support protrusion is formed at a free end portion of the support pin to support the one end of the slip ring holder inserted in the bearing support part.

According to an exemplary implementation of an embodiment of the present invention, the slip ring holder body may be provided with support projections formed around an outer surface thereof at a predetermined interval. The gear pan may be provided with grooves formed in one end portion thereof, onto which the support projections are fitted.

According to an exemplary implementation of an embodiment of the present invention, the slip holder body may be provided with a bearing support projection for supporting the other end of the bearing, which is protrudingly formed on an end portion thereof.

According to an exemplary implementation of an embodiment of the present invention, the gear pan may be provided with a guide protrusion formed on one end portion thereof. The middle plate may be provided with a hole into which the guide protrusion is inserted.

According to an exemplary implementation of an embodiment of the present invention, the security camera may include a motor installed on the top plate to supply power for rotating the top plate. The gear pan body is provided with gear teeth formed on an outer surface thereof.

According to an exemplary implementation of an embodiment of the present invention, an inner diameter of the bearing support part may be such a size that the outer surfaces of the bearing and slip ring holder body are brought into contact with the inner surface of the bearing support part.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects and features of the present invention will be more apparent by describing certain exemplary embodiments of the present invention with reference to the accompanying drawings, in which.

Throughout the drawings, the same drawing reference numerals will be understood to refer to the same elements, features, and structures.

DETAILED DESCRIPTION OF EXEMPLARY EMBODIMENTS

Hereinafter, detailed configurations of a security camera in accordance with exemplary embodiments of the present invention are described in detail with reference to the accompanying drawings.

Figure 2:
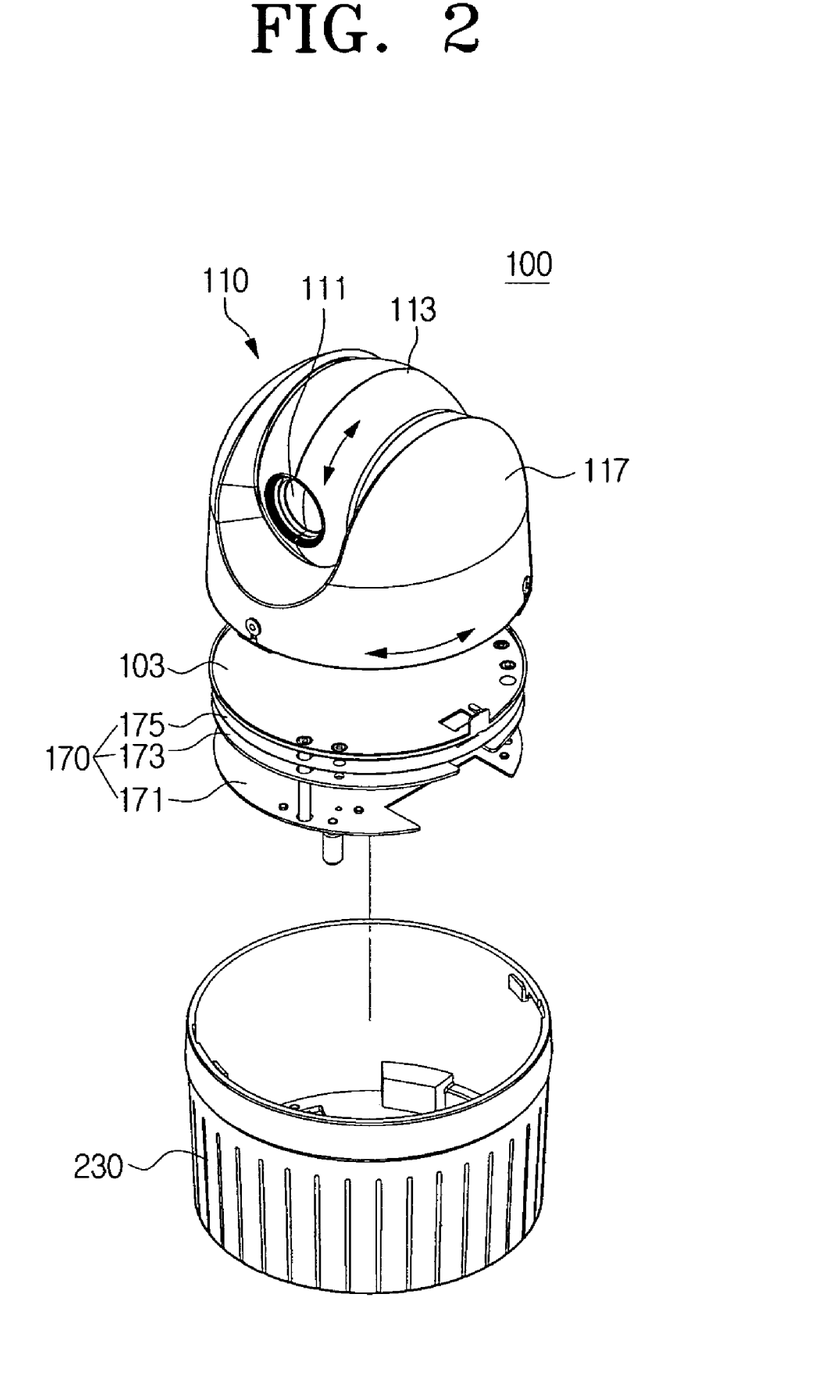
FIG. 2 is a perspective view of a security camera in accordance with an exemplary embodiment of the present invention.

FIG. 2 is a perspective view of the security camera in accordance with an exemplary embodiment of the present invention.

Referring to FIG. 2, a security camera 100 includes a camera unit 110, a power unit 170 and a case body 230.

The camera unit 110 has a camera lens module 111. A first housing 113 supports the camera lens module 111 to be rotatable upwardly and downwardly. A second housing 117 is rotatable leftwardly and rightwardly and houses the first housing 113 in which the camera lens module 111 is housed.

The power unit 170, which supplies a converted voltage necessary for camera operation, has a bottom plate 171 and a power circuit board 173, which is a fixed printed circuit board, installed above the bottom plate 171. An insulator 175 is installed above the power circuit board 173. A middle plate 103 is installed above the insulator.

The power unit 170 is fixed on an inner bottom of the case body 230, which is fixed on a ceiling or a wall. The camera unit 110 is rotatably supported on the middle plate 103.

Figure 3:
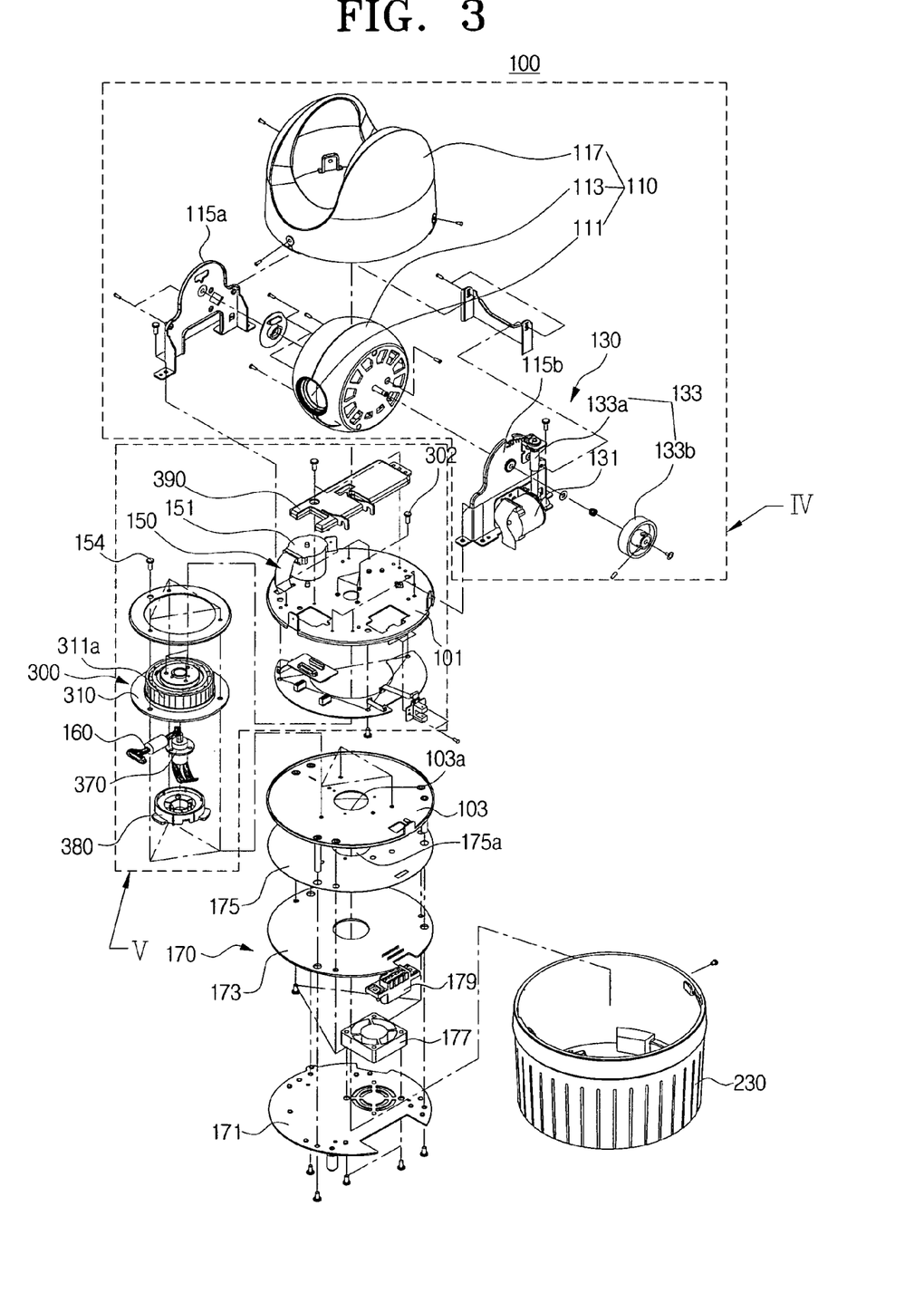
FIG. 3 is an exploded perspective view of the security camera of FIG. 2.
Figure 4:
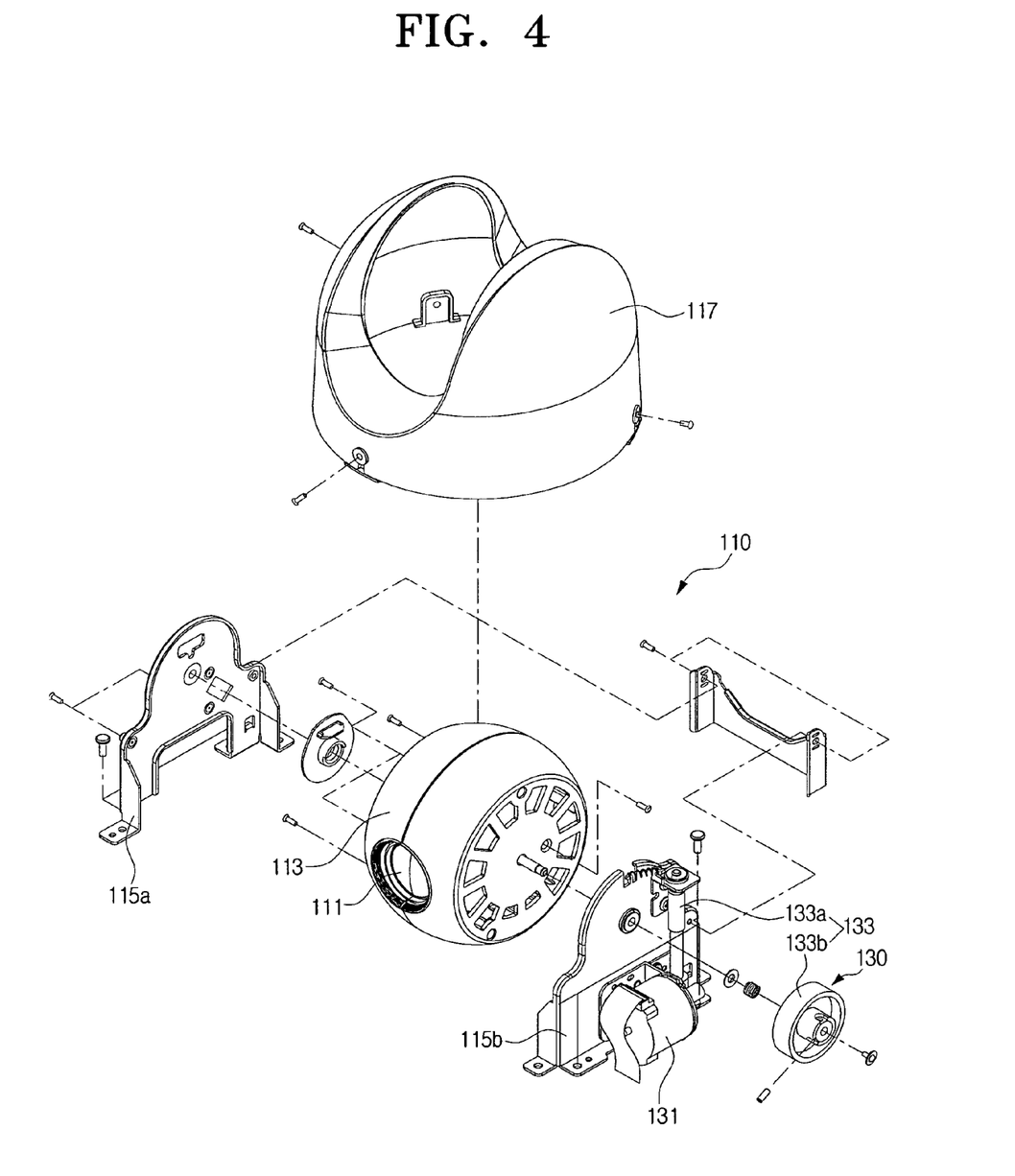
FIG. 4 is an enlarged, exploded perspective view of section IV of FIG. 3.
Figure 5:
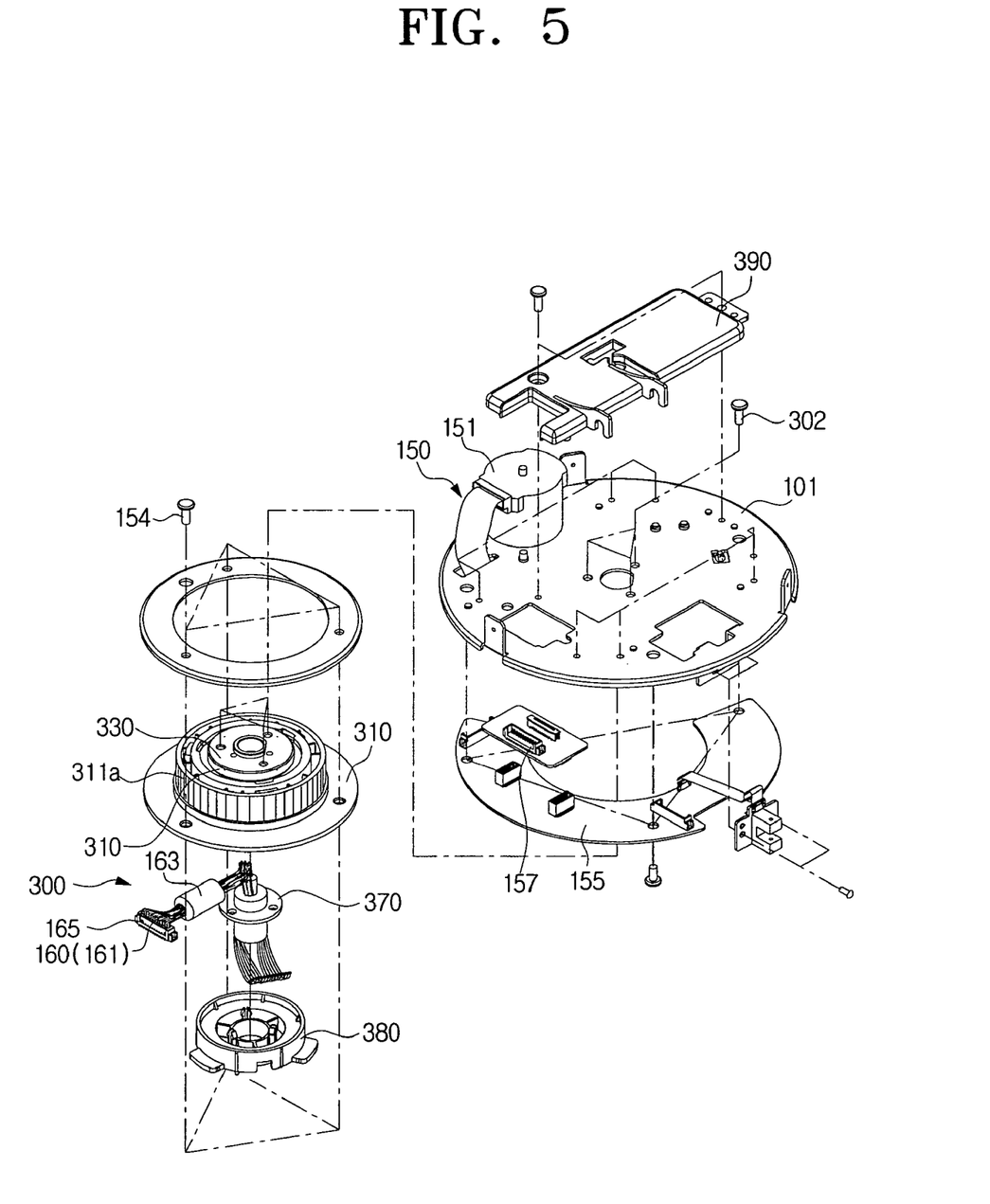
FIG. 5 is an enlarged, exploded perspective view of section V of FIG. 3.

FIG. 3 is an exploded perspective view of the security camera according to an exemplary embodiment of the present invention. FIG. 4 is an enlarged, exploded perspective view of section IV of FIG. 3. FIG. 5 is an enlarged, exploded perspective view of section V of FIG. 3.

Referring to FIG. 3, the security camera 100 includes the camera unit 110, an up-down rotation unit 130, a left-right rotation unit 150, a power unit 170, a slip ring 370, a connection unit 300, and a case body 230.

Referring to FIGS. 3 and 4, the camera unit 110 is installed on an upper surface of a top plate 101 to be rotatable upwardly and downwardly (vertically) and from side to side (horizontally). The camera unit 110 has the first housing 113 inside of which the camera lens module 111 is housed. A pair of camera brackets 115a and 115b support the first housing 113 on the upper surface of the top plate 101. The second housing 117 houses the first housing 113 with the camera brackets 115a and 115b therein.

The upward and downward (vertical) rotation unit 130 has an up-down rotation motor 131 installed on either one of the camera brackets 115a and 115b, and a gear unit 133 (shaft 133a and gear 133b). The gear unit 133 rotates the first housing 113, which incorporates the camera lens module 111 therein, upwardly and downwardly.

Referring to FIGS. 3 and 5, the left-right (horizontal) rotation unit 150 has a left-right rotation motor 151 installed on the upper surface of the top plate 101. A gear unit (not shown) having a gear pan 310, which is connected to the left-right rotation motor 151, rotates the top plate 101. A motor circuit board 155, which is a movable circuit board, is installed on a lower surface of the top plate 101. A connector socket 157 is disposed on the motor circuit board to which an electric wire connector 165 disposed at one end of an upper connection electric wire 161 of a connection electric wire 160 is connected.

The gear pan 310 is fixed to an upper surface of the middle plate 103 with fixing screws 154. Gear teeth 311a are formed on an outer surface of the gear pan 310. Therefore, when a pinion gear (not shown) connected to an axle of the left-right rotation motor 151 and meshed with the gear teeth 311a is rotated leftwardly and rightwardly, the top plate 101 is rotated leftwardly and rightwardly, thus rotating the camera unit 110 leftwardly and rightwardly. The left-right rotation motor 151 is rotated together with the top plate 101 during operation thereof. The gear pan 310 transmits power for rotating the top plate 101 by the gear teeth 311a formed on the outer circumferential surface thereof and, as well, a function to fix a slip ring 370 to the inside thereof. The fixing structure of the slip ring 370 to the gear pan 310 is described hereafter.

Referring again to FIG. 3, the power unit 170, which supplies power converted in an external power unit (not shown) to the camera unit 110, the up-down rotation unit 130, and the left-right rotation unit 150, includes the bottom plate 171 and the power circuit board 173, which is a fixed circuit board, disposed on an upper portion of the bottom plate 171. A power socket 179 is disposed on the power circuit board 173, which is connected with an external power socket (not shown). A heat radiation fan 177 is disposed on the bottom plate 171 for discharging heat generated during operation. Additionally, an insulator 175 is disposed on a lower surface of the middle plate 103 for insulation with the power circuit board 173. In an exemplary implementation, the insulator 175 is adhered to the lower surface of the middle plate 103.

The bottom plate 171 described above is disposed on an inner bottom of the case body 230.

Wire guide 390 substantially prevents free movement of the connection electric wire 160 (161) protruding from the upper portion of the top plate 101.

The slip ring 370 connects the connection electric wire 160 to the power circuit board 173, which is fixed non-rotatably inside of the case body 230, such that the connection electric wire 160 is not twisted. The connection unit 300 rotatably supports the top plate 101 and a gear connection structure for transmitting power of the left-right rotation motor 151.

Figure 6:
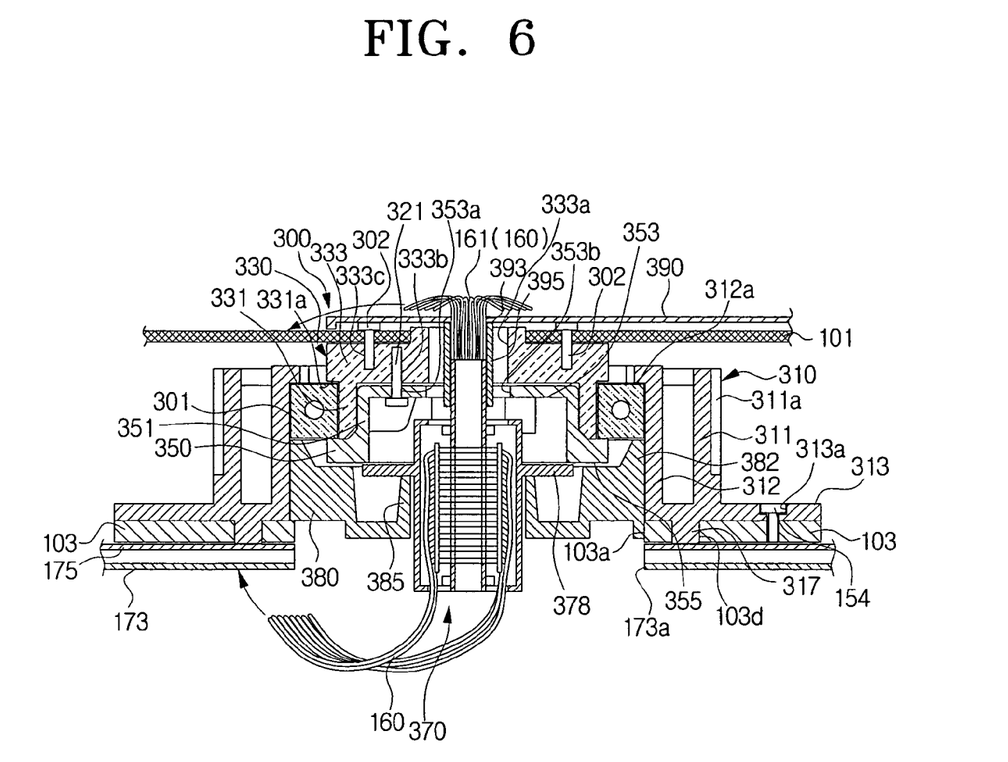
FIG. 6 is an elevational view in cross section of a connection unit in accordance with an exemplary embodiment of the present invention.
Figure 7:
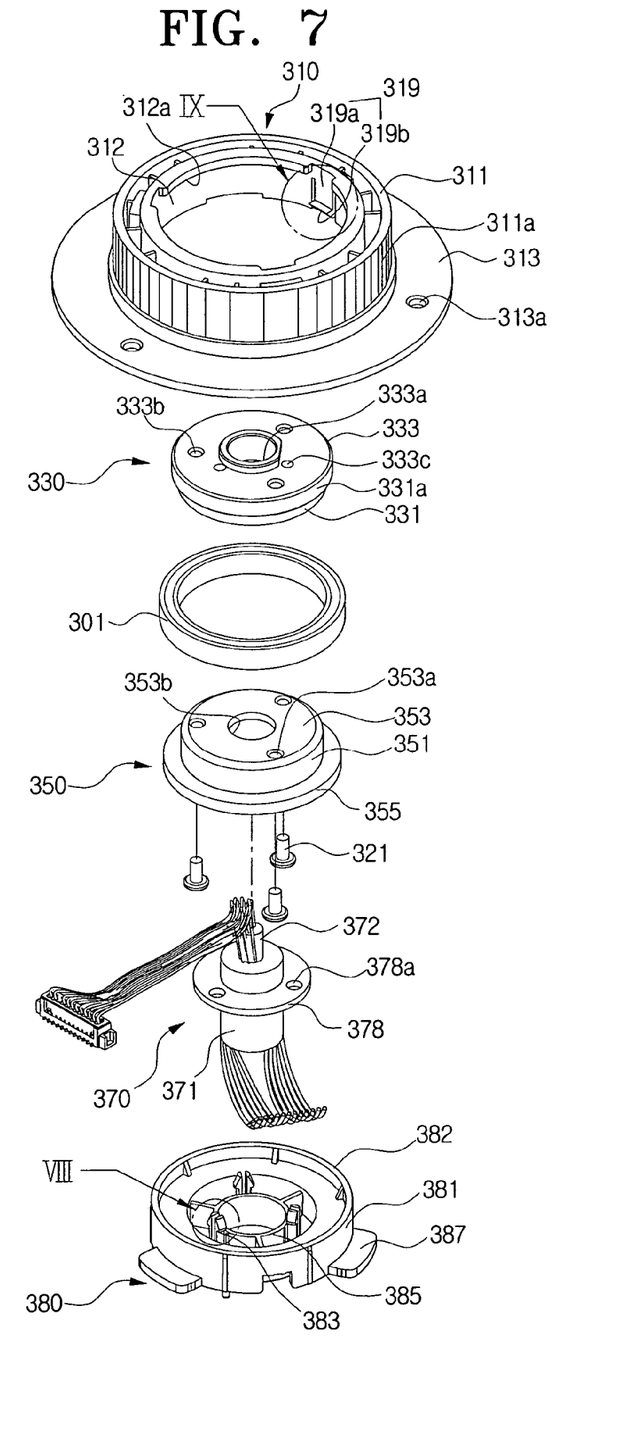
FIG. 7 is an exploded perspective view of the connection unit in accordance with an exemplary embodiment of the present invention.
Figure 8:
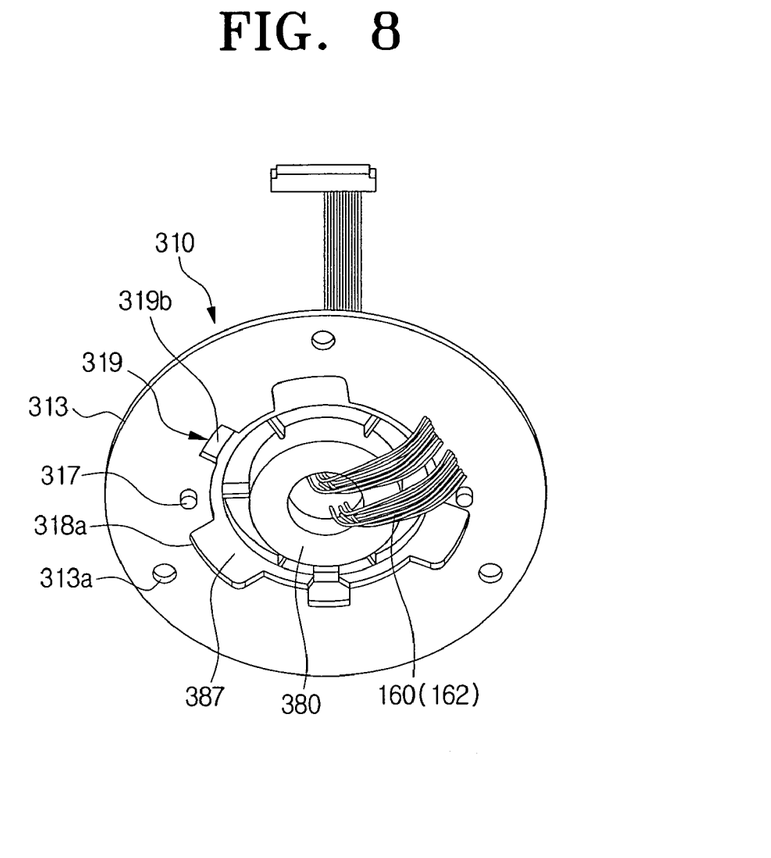
FIG. 8 is a perspective view of a bottom surface of the connection unit in accordance with an exemplary embodiment of the present invention.

FIG. 6 is an elevational view in cross section of the connection unit according to an exemplary embodiment of the present invention. FIG. 7 is an exploded perspective view of the connection unit according to an exemplary embodiment of the present invention. FIG. 8 is a bottom perspective view of a bottom surface of the connection unit according to an exemplary embodiment of the present invention.

Referring to FIGS. 6 and 7, the connection unit 300 includes the middle plate 103 disposed on one surface of the power circuit board 173, which is a fixed circuit board, and provided with a through-hole 103a formed therein. The gear pan 310 is connected to the middle plate 103 and has a substantially cylindrical shape with its upper and lower ends open. A bearing 301 is disposed inside the gear pan 310. The connection unit 300 includes a bearing holder 330 connected to an inner surface of the top plate 101. A bearing cover 350 is connected to the bearing holder 330 to support the other end of the bearing 301. A slip ring holder 380 is coupled to the gear pan 310 to secure the slip ring 370 inside the gear pan 310.

The gear pan 310 is provided with a bearing support part 312 into which an outer surface of the bearing 301 is inserted. A gear pan body 311 has a substantially cylindrical shape with its upper and lower ends open. A flange part 313 is formed at one end portion of the gear pan body 311 and has fixture holes 313a through which fixing screws 154 pass. A bearing disengagement prevention projection 312a is formed at one end portion of the bearing support part 312 to prevent disengagement of the bearing 301. The gear pan 310 is fixed to the middle plate 103 with the fixing screws 154. Gear teeth 311a are formed on an outer surface of the gear pan body 311 and transmit a driving force of the left-right rotation motor 151.

Guide protrusions 317 (FIG. 8) are formed on the end portion of the gear pan 310. The middle plate 103 has holes 103d into which the guide protrusions 317 are inserted. The guide protrusions 317 fix the gear pan 310 closely to the middle plate 103. With such a configuration, free movement of the gear pan 310 is substantially prevented and the efficiency of assembling the gear pan 310 with the middle plate 103 is improved.

The bearing holder 330 has a bearing holder body engagement protrusion 331a brought into contact with one end of the bearing 301 to prevent further insertion thereof when being inserted in an inner surface of the bearing 301 to a predetermined depth. A bearing holder body 331 has a substantially cylindrical shape with one end open and a bearing holder connection surface 333 formed at the other end of the bearing holder body 331. Fixture holes 333c and a through hole 333a are formed in a center portion of the bearing holder body 331. The bearing holder 330 is connected to the top plate 101 by screwing fixture screws 302 into the fixture holes 333c.

The bearing cover 350 has a bearing cover body 351 inserted in the inner surface of the bearing holder body 331 and has a substantially cylindrical shape with one end open. A bearing cover connection surface 353 has fixture holes 353a and a through hole 353b formed in a center portion thereof and that is brought into contact with and combined with the bearing holder connection surface 333 via fixture screws 321. A bearing support projection 355 is formed at a lower end portion of the bearing cover body 351 to support the one end of the bearing 301. Fixture holes 333b are formed in the bearing holder connection surface 333 corresponding to the fixture holes 333b.

The slip ring holder 380 has a slip ring holder body 381 inserted in the inner surface of the bearing support part 312 and having a substantially cylindrical shap with its upper and lower ends open. A slip ring fixing part 385 is disposed in a center portion of the slip ring holder body 381 to receive the slip ring 370 therein and has support protrusions 383 formed at one end thereof to support the slip ring 370. On one end portion of the slip ring holder body 381, a bearing support projection 382 extends upwardly to supports the one end of the bearing 301. Preferably, the outer diameter of the slip ring holder body 381 is formed to be substantially identical to that of the bearing 301.

On an outer part of the slip ring 370, a flange part 378 extends outwardly and has insertion holes 378a formed therein for insertion of the support protrusions 383 therein.

Referring to FIG. 8, around an outer surface of one end portion of the slip ring holder body 381, support projections 387 are additionally formed at a predetermined interval. Grooves 318a are formed in one end portion of the gear pan 310 into which the support projections 387 are fitted.

Figure 9:
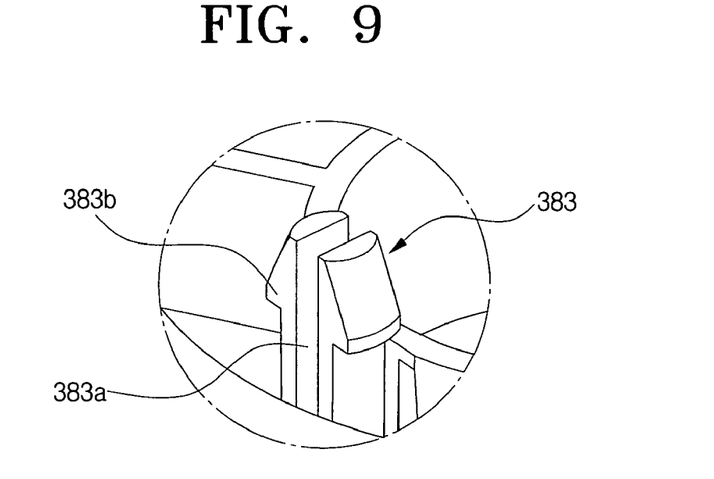
FIG. 9 is an enlarged perspective view of section VIII of FIG. 7.
Figure 10:
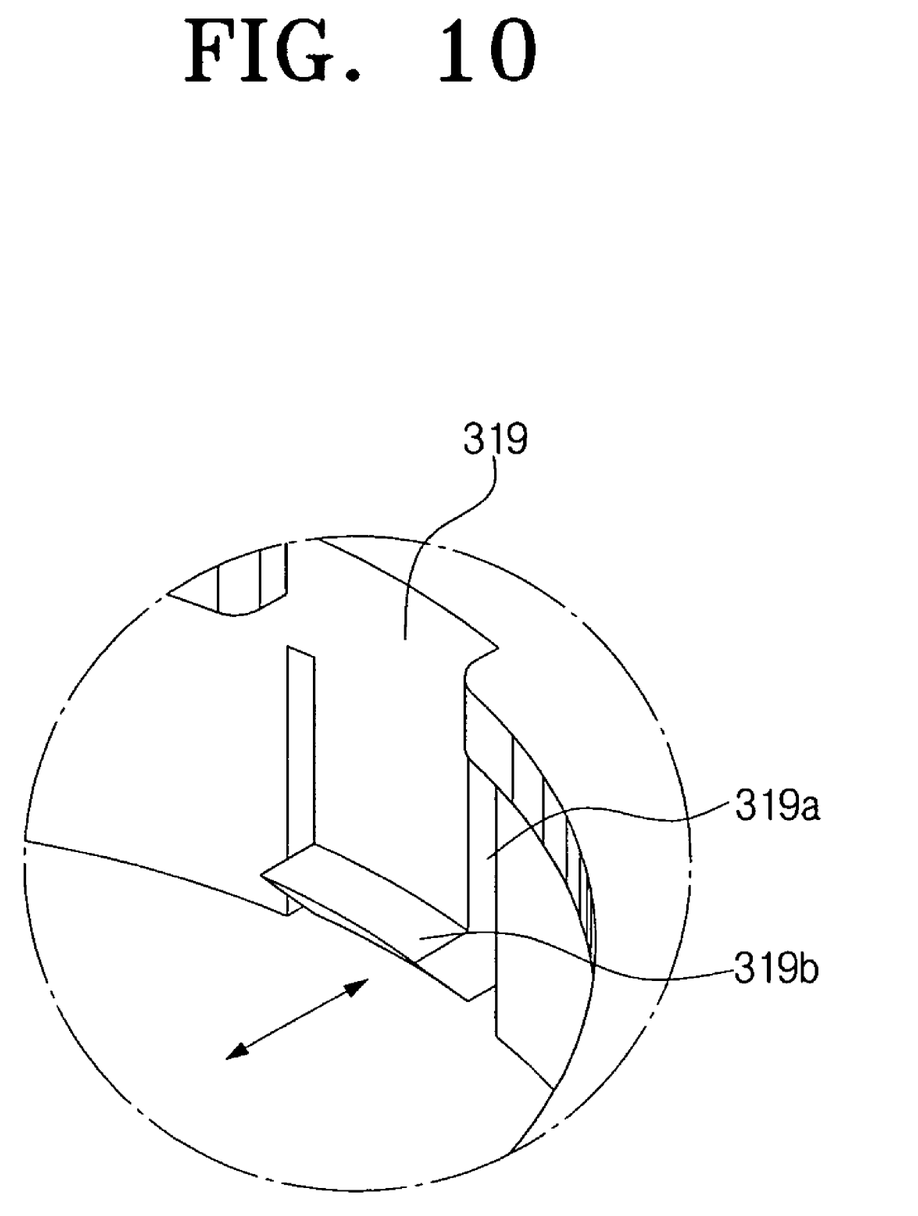
FIG. 10 is an enlarged perspective view of section IX of FIG. 7.

FIG. 9 is an enlarged perspective view of section VIII of FIG. 7. FIG. 10 is an exploded perspective view of section IV of FIG. 7.

Referring to FIGS. 7 and 9, the support protrusions 383 are disposed on the slip ring fixing part 385 at a predetermined interval. Each of the support protrusions 383 has a slit 383a formed in a lengthwise direction thereof to split the support protrusion into two halves. An engagement protrusion 383b prevents disengagement of the support protrusion 383 from the insertion hole 378a after being inserted thereinto and is formed on an upper end portion of each half of the split support protrusion 383.

Referring to FIGS. 7 and 10, support members 319 are formed on the bearing support part 312 to support the slip ring holder 380. The support member 319 has a support pin 319a formed in the bearing support part 312 that is resilient in a radial direction. A support protrusion 319b is formed at a free end portion of the support pin 319a to support the one end of the slip ring holder 380 inserted in the bearing support part 312. Preferably, the inner diameter of the bearing support part 312 is formed to have a size approximately corresponding to the outer diameter of the bearing 301 so that the outer surface of the bearing 301 is brought into contact with the inner surface of the bearing support part 312.

Hereinafter, assembly of the connection unit according to an exemplary embodiment of the present invention is described.

Referring to FIGS. 6 and 7, the bearing 301 is inserted onto the outer surface of the bearing holder body 331 of the bearing holder 330. The one end of the bearing 301 is brought into contact with the engagement protrusion 331a to prevent further insertion thereof.

Next, the bearing cover body 351 of the bearing cover 350 is inserted in the inner surface of the bearing 301. The bearing cover connection surface 353 is brought into contact with the bearing holder connection surface 333, and the bearing support projection 355 is brought into contact with the other end of the bearing 301.

Then, the fixture screws 321 are screwed into the fixture holes 353a of the bearing cover connection surface 353 and the fixture holes 333c of the bearing holder connection surface 333 to connect the bearing holder 330, the bearing cover 350 and the bearing 301 into one body.

Next, the support protrusions 383 of the slip ring holder 380 are inserted in the insertion holes 378a formed in the flange part 378 of the slip ring 370. When the engagement protrusion 383b of the slip ring holder 380 is pressed into the insertion hole 378a, the two halves of the support protrusion 383 slit by the slit 383a become closer. After the engagement protrusion 383b passes through the insertion hole 378a, the two halves of the support protrusion 383 return back to their initial positions. Therefore, the slip ring 370 is not detached from the slip ring holder 380 because the insertion holes 378a are restrained by the engagement protrusions 383b.

After the slip ring 370 and slip ring holder 380 are connected into one body as described above, the assembly body formed by assembling the bearing holder 330, the bearing 301 and the bearing cover 350 sequentially is inserted inside of the bearing support part 312 of the gear pan 310. At this time, the outer surface of the bearing 301 is snugly fit onto the inner surface of the bearing support part 312.

Then, the slip ring holder 380 connected to the slip ring 370 into one body is inserted inside of the bearing support part 312. The outer surface of the slip ring holder body 381 is snugly fit onto the bearing support part 312. The slip ring holder body 381 is inserted inside of the bearing support part 312 until the bearing support projection 382 disposed at the upper end portion of the slip ring holder body 381 supports the end of the bearing 301.

The slip ring holder 380 assembled as described above is fixed to the gear pan 310 by the support members 319 disposed at the bearing support part 312.

Referring to FIGS. 7 and 10, when the slip ring holder body 381 is inserted inside of the bearing support part 312, the outer surface of the slip ring holder body 381 contacts the support protrusion 319b of the support member 319. Therefore, the support members 319 are resiliently bent in an outward direction ('→' direction of FIG. 10) from the center of the gear pan 310. When the slip ring holder body 381 is completely inserted in the bearing support part 312, the outer surface of the slip ring holder body 381 is separated from the support protrusions 319b, so that the support members 319 are returned back to their initial positions, thereby causing the support protrusions 319b to support the end of the slip ring holder body 381. Therefore, the slip ring holder 380 is assembled with the gear pan 310 into one body. The support projections 387 disposed at the end portion of the slip ring holder body 381a are received by the grooves 318a formed in end portion of the gear pan 310 (FIG. 8).

The gear pan 310 assemblied with the bearing holder 330, the bearing 301, the bearing cover 350, the slip ring 370 and slip ring holder 380 inside thereof is disposed on the lower surface of the top plate 101. The fixture screws 302 are screwed into the fixture holes 333c disposed in the bearing holder connection surface 333 of the bearing holder 330 via the top plate 101 (FIG. 6).

The security camera according to exemplary embodiment of the present invention has an advantage of compactness in size, since the rotation support part for rotatably supporting the camera unit, that is, the bearing support part, and the gear part for transmitting power used to rotate the camera unit leftwardly and rightwardly are connected with each other in the connection unit into one body.

Furthermore, the slip ring may be connected with the slip ring holder without using separate fixing members.

Furthermore, because the gear pan is fixed to the middle plate by the guide protrusions, free movement of the gear pan is substantially prevented. Therefore, the efficiency of assembling the security camera may be improved.

The foregoing embodiments and advantages are merely exemplary and are not to be construed as limiting the present invention. The present teaching may be readily applied to other embodiments of the present invention. Also, the description of the exemplary embodiments of the present invention is intended to be illustrative, and not to limit the scope of the claims, and many alternatives, modifications, and variations will be apparent to those skilled in the art.

What is claimed is:

1. A security camera, comprising:
a camera unit;
a top plate rotatably supporting the camera unit;
a movable circuit board connected to the top plate;
a fixed circuit board spaced from the movable circuit board;
an electric wire electrically connecting the movable circuit board and the fixed circuit board;

a slip ring substantially preventing the electric wire from being twisted by rotational movement of the movable circuit board; and a connection unit supporting the slip ring and rotatably supporting the top plate.

2. The security camera according to claim 1, wherein the connection unit includes a middle plate disposed on one side of the fixed circuit board and having a through hole;

a gear pan connected to the middle plate and having a substantially tubular shape with open upper and lower ends;

a bearing disposed inside the gear pan;

a bearing holder in which the bearing is inserted from one end of the bearing holder and connected to the top plate;

a bearing cover connected to the bearing holder and supporting the other end of the bearing; and a slip ring holder connected to the gear pan to secure the slip ring to the inside of the gear pan.

3. The security camera according to claim 2, wherein the gear pan includes a gear pan body having a bearing support part supporting an outer surface of the bearing and having a substantially cylindrical shape with open upper and lower ends;

a flange part formed at one end portion of the gear pan body and having a fixture hole therein to facilitate connection of the gear pan to the middle plate; and a bearing disengagement prevention projection formed at one end portion of the bearing support part to prevent disengagement of the bearing.

4. The security camera according to claim 2, wherein the bearing holder includes a bearing holder body having a substantially cylindrical shape with one open end open and having an engagement protrusion that contacts with the one end of the bearing to prevent further insertion thereof when the bearing holder body is inserted in an inner surface of the bearing to a predetermined depth; and a bearing holder connection surface formed in the other end portion of the bearing holder body and having a through hole formed in a center portion thereof and a fixture hole to facilitate connection of the bearing holder to the top plate.

5. The security camera according to claim 4, wherein the bearing cover includes a bearing cover body inserted inside of the bearing holder body and having a substantially cylindrical shape with one open end;

a bearing cover connection surface brought into contact with the bearing holder connection surface and having a fixture hole into which a fixture screw is disposed to connect the bearing cover with the bearing holder, and a through hole formed in a center portion thereof; and a bearing support projection formed at the one end portion of the bearing cover body to support the other end of the bearing.

6. The security camera according to claim 3, wherein the slip ring holder includes a slip ring holder body inserted in an inner surface of the bearing support part and having a substantially cylindrical shape with upper and lower open ends; and a slip ring fixing part disposed in a center portion of the slip ring holder body to allow the slip ring to pass through an inside thereof and having a support protrusion formed on one end portion thereof to support the slip ring.

7. The security camera according to claim 6, wherein the slip ring has a flange part formed on an outer surface and having an insertion hole into which the support protrusion is inserted.

8. The security camera according to claim 7, wherein the slip ring fixing part includes a plurality of support protrusions disposed on the slip ring fixing part at predetermined intervals, and each of the support protrusions having a slit formed in a lengthwise direction thereof splitting each of the support protrusion into two halves; and an engagement protrusion formed on an upper end portion of the each half of the split support protrusion for preventing disengagement of the support protrusion from the insertion hole after being inserted therein.

9. The security camera according to claim 6, wherein a support member is formed to support the slip ring holder on the bearing support part.

10. The security camera according to claim 9, wherein the support member includes a support pin formed in the bearing support part that is resilient in a radial direction; and a support protrusion formed at a free end portion of the support pin to support the one end of the slip ring holder inserted in the bearing support part.

11. The security camera according to claim 6, wherein the slip ring holder body has support projections formed around an outer surface thereof at a predetermined interval; and the gear pan has grooves formed in one end portion thereof adapted to receive the support projections.

12. The security camera according to claim 6, wherein the slip holder body has a bearing support projection protruding from an end portion thereof for supporting the other end of the bearing.

13. The security camera according to claim 2, wherein the gear pan has a guide protrusion formed on one end portion thereof; and the middle plate has a hole into which the guide protrusion is inserted.

14. The security camera according to claim 3, wherein a motor is disposed on the top plate to supply power for rotating the top plate; and the gear pan body has gear teeth formed on an outer surface thereof.

15. The security camera according to claim 6, wherein the outer surfaces of the bearing and the slip ring holder body contact the inner surface of the bearing support part.

* * * * *